Figures 9, 10:
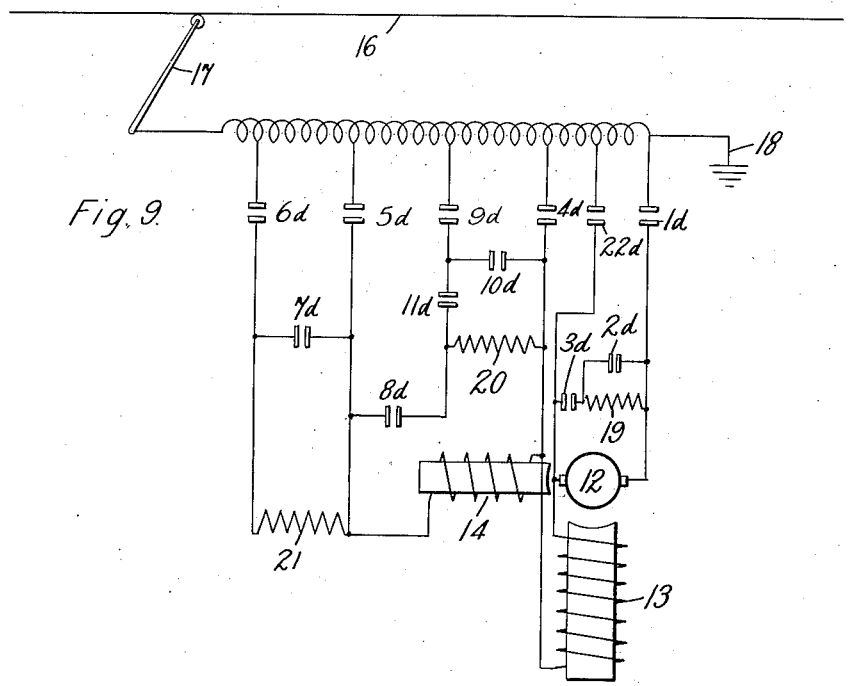

R. E. HELLMUND.
SYSTEM OF CONTROL.
APPLICATION FILED SEPT. 25, 1914.
1,251,658.
Patented Jan. 1, 1918.
4 SHEETS—SHEET 1.
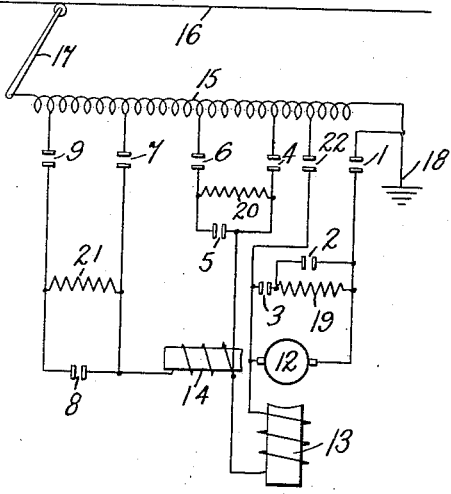
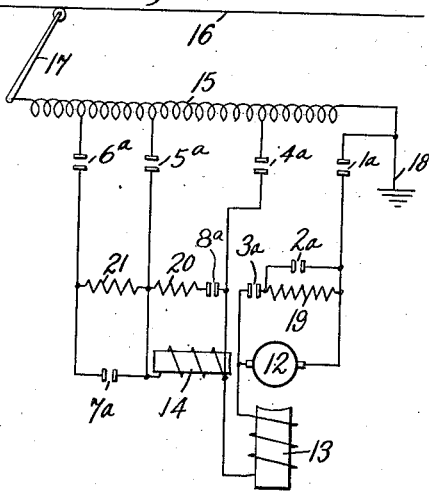
WITNESSES:
INVENTOR
Rudolf E. Hellmund
BY
ATTORNEY R. E. HELLMUND.
SYSTEM OF CONTROL.
APPLICATION FILED SEPT. 25, 1914.
1,251,658.
Patented Jan. 1, 1918.
4 SHEETS—SHEET 2.
Fig. 5.
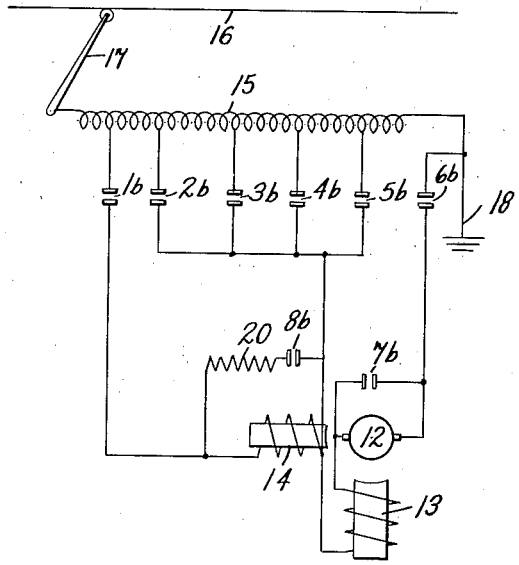
Fig. 7.
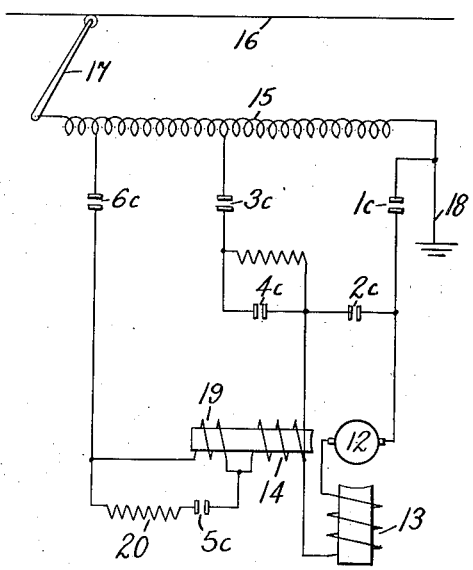
Fig. 6.
| | | 1b | 2b | 3b | 4b | 5b | 6b | 7b | 8b |
|---|---|---|---|---|---|---|---|---|---|
| 1 | R | ○ | | | | | ○ | ○ | |
| 2 | | ○ | | | | | ○ | ○ | ○ |
| 3 | | ○ | | | | | ○ | | ○ |
| 4 | | ○ | | | | ○ | ○ | | ○ |
| 5 | R | ○ | | | | ○ | ○ | | |
| 6 | | ○ | | | | | ○ | ○ | ○ |
| 7 | | ○ | | | | | ○ | | ○ |
| 8 | | ○ | | ○ | | | ○ | | ○ |
| 9 | R | ○ | | | ○ | | ○ | | |
| 10 | | ○ | | | ○ | | ○ | | ○ |
| 11 | | ○ | | | | | ○ | | ○ |
| 12 | | ○ | ○ | | | | ○ | | ○ |
| 13 | R | ○ | | ○ | | | ○ | | |
| 14 | | ○ | | ○ | | | ○ | | ○ |
| 15 | | ○ | | | | | ○ | | ○ |
| 16 | | ○ | ○ | | | | ○ | | ○ |
| 17 | R | ○ | ○ | | | | ○ | | |
Fig. 8.
| | 1c | 2c | 3c | 4c | 5c | 6c |
|---|---|---|---|---|---|---|
| 1 | ○ | ○ | | | | ○ |
| 2 | ○ | ○ | ○ | | | ○ |
| 3 | ○ | | ○ | | | ○ |
| 4 | ○ | | ○ | ○ | | ○ |
| 5 | ○ | | ○ | ○ | ○ | ○ |
| 6 | ○ | | | | ○ | ○ |
WITNESSES:
Fred H Miller
D. C. Davis
INVENTOR
Rudolf E. Hellmund
BY
Wesley G Carr
ATTORNEY

R. E. HELLMUND.
SYSTEM OF CONTROL.
APPLICATION FILED SEPT. 25, 1914.

1,251,658.

Patented Jan. 1, 1918.
4 SHEETS—SHEET 3.

WITNESSES:
Fred H. Miller
D. C. Davis

INVENTOR
Rudolf E Hellmund
BY
Wesley G. Carr
ATTORNEY

UNITED STATES PATENT OFFICE.

RUDOLF E. HELLMUND, OF PITTSBURGH, PENNSYLVANIA, ASSIGNOR TO WESTINGHOUSE ELECTRIC AND MANUFACTURING COMPANY, A CORPORATION OF PENNSYLVANIA.

SYSTEM OF CONTROL.

1,251,658.      Specification of Letters Patent.      Patented Jan. 1, 1918.

Application filed September 25, 1914. Serial No. 863,505.

*To all whom it may concern:*

Be it known that I, RUDOLF E. HELLMUND, a subject of the Emperor of Germany, and a resident of Pittsburgh, in the county of Allegheny and State of Pennsylvania, have invented a new and useful Improvement in Systems of Control, of which the following is a specification.

My invention relates to alternating-current motors of the series commutating type having both exciting and inducing field windings, and it has for its object to provide means whereby a motor of the character specified may be accelerated in a uniform and gradual manner, a plurality of efficient operating speeds may be obtained with the use of but few controlling switches, and sparking at the commutator may be obviated at all speeds.

In my copending application Serial No. 810,764 filed January 7, 1914, and assigned to Westinghouse Electric & Manufacturing Company, I have disclosed a method of accelerating a series commutating motor wherein the connections at starting are such that the machine operates as a repulsion motor and are then altered so that the operation is that of a doubly fed motor wherein the armature and the exciting field winding are connected in series relation across one portion of an alternating-current source, such, for example, as the secondary winding of a transformer, and the inducing field winding is connected across another portion of said source. Efficient speed control may then be obtained by independently varying the voltages impressed upon the armature and upon the inducing field winding. In motors of the character specified, the inducing field winding is preferably provided with a greater number of turns than the armature, generally, substantially twice as many. In changing over from the repulsion motor connection to the doubly-fed connection, there is, for a short time, a series connection between the armature and the inducing field winding and, because of the above noted ratio of turns, there would be induced in the short circuited armature coils a heavy current with consequent severe sparking at the commutator. In the above noted application, I have disclosed means comprising a resistance member which is momentarily connected in parallel with the inducing field winding during this transition period in order to shunt a portion of the current therefrom and accordingly reduce the inducing action thereof upon the armature winding.

I have found that this resistance member, when connected in parallel with the inducing field winding at high speeds and high power factor of the motor, provides a very favorable running connection.

Furthermore, I have found that, by suitable connections, a resistance member may be employed in parallel with the inducing field winding during the transition period from a repulsion connection to a doubly-fed connection and may then be employed as a preventive resistance in securing a gradual increase of the voltage impressed on the armature without short circuiting a portion of the source and may finally be connected in parallel with the inducing field winding to obtain an efficient high-speed running condition. In this manner, I am enabled to use a single resistance member throughout the accelerating and high-speed operating positions of the motor, with consequent economy of both space and weight, and I am enabled to secure all of the above connections by a relatively small number of switches.

Furthermore, I have found that, in a motor provided with inducing field windings, both of the compensating and of the commutating types, by connecting a resistance member in parallel with the commutating winding at high speeds, an especially effective combination of connections is obtained, with small loss of energy in the resistance member.

Figure 11:
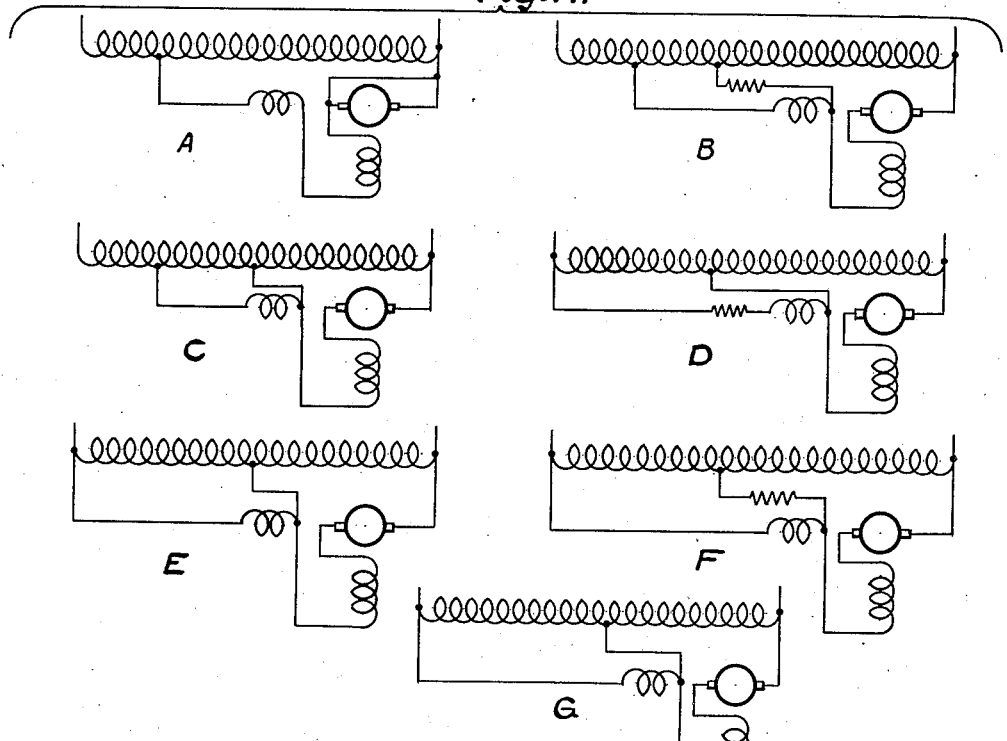

Referring to the accompanying drawings, Figures 1, 3, 5, 7 and 9 are diagrammatic views of motors and their attendant control circuits, illustrating different embodiments of my invention; Figs. 2, 4, 6, 8, and 10 are charts illustrating the sequence of switch operation in the motor circuits respectively associated therewith, the running positions of the motor in each case being shown by the letter "R" in an appropriate column in the sequence chart; and Figs. 11 and 12 are groups of simplified diagrammatic circuits, illustrating the development of the connections in the systems of Figs. 1 and 3, respectively.

Referring to Figs. 1 and 2, a motor 12 is provided with an exciting field winding 13 and with an inducing field winding 14. Current for the motor 12 is derived from a suitable source 15, shown in this case as an auto-transformer such as would be employed on a railway vehicle. One terminal of the source 15 is connected to a trolley wire 16 by a suitable trolley 17 and the other terminal is grounded, as shown at 18. Obviously, my invention is not limited to the use of an auto-transformer and, consequently, 15 may indicate the secondary winding of an ordinary transformer. Furthermore, my invention is not limited to railway motors but may be employed, with equally good results, in the control of variable-speed industrial motors, in which case, the trolley connection 17 and the ground connection 18 would be replaced by a permanent metallic circuit. The source 15 is provided with a plurality of voltage taps leading, respectively, to suitable switches 1, 4, 6, 7, and 9. These switches may be of any suitable type, either manually, electrically or pneumatically operated and, as the method of operation forms no part of my invention, I have shown them in diagrammatic form. If the switches are to be hand controlled, they may be embodied in a controller of the ordinary type. At starting, as shown in Fig. 2, switches 1, 3, and 7 are closed, with the result that the armature 12 is shunted by a resistance member 19 and the field windings 13 and 14 are connected in series relation. Under these conditions, the motor 12 will be operated at very low speed as a repulsion motor because the resistance member 19 is connected across the terminals thereof. The switch 2 is then closed, with the result that a low-resistance path is provided across the terminals of the armature 12, and a satisfactory running position is obtained as a repulsion motor (Fig. 11A). The switch 6 is then closed and a doubly-fed connection is obtained through a resistance member 20 without a violent disturbance of the voltage of a point intermediate between the windings 13 and 14 (Fig. 11B). A transition to the first doubly-fed running position may now be made by opening switches 2 and 3, closing the switch 4, and opening switch 6 (Fig. 11C). If, however, a very gradual acceleration is required, it is preferable to separately feed the armature for a step by closing the switch 22, as indicated in position 4 of the sequence chart shown in Fig. 2. In order to obtain the next operating position as a doubly-fed motor, it is desirable to increase the voltage impressed upon the inducing field winding 14 by shifting the outer terminal thereof from the tap 7 to the tap 9. This is done by first closing the switch 9, allowing the switches 7 and 9 to be connected through a resistance member 21, (Fig. 11D) opening the switch 7 and then short circuiting the resistance member 21 by a suitable switch 8 (Fig. 11E). The final operating position is obtained by increasing the voltage supplied to the armature 12 by shifting the intermediate connection from the voltage tap 4 to the voltage tap 6. This is done by closing the switch 6 again, so that the two voltage taps are connected through the resistance member 20, the switch 4 is then opened and the switch 5 closed (Figs. 11F and 11G). In this manner, smooth and gradual acceleration of the motor is obtained, with four running speeds, at which time no energy is wasted by the inclusion of resistance members in the control circuits.

Figure 12:
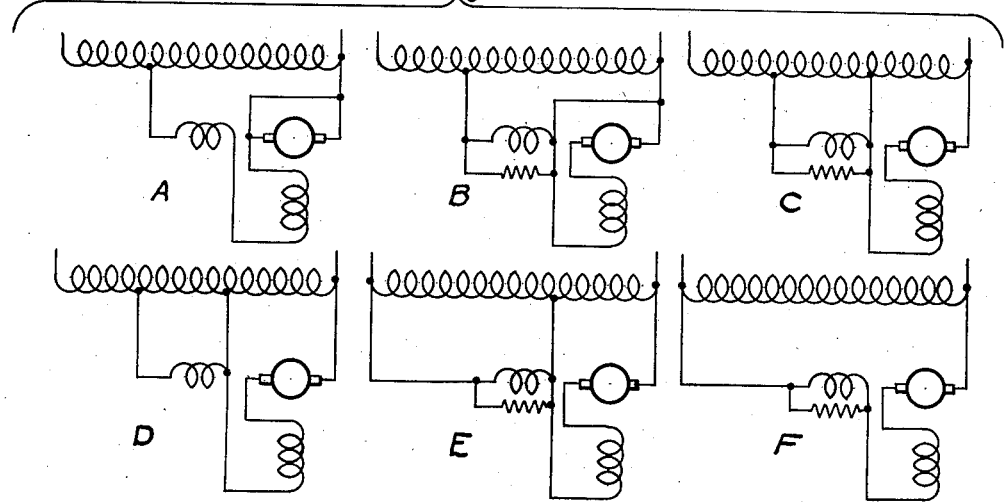

Referring to the form of my invention shown in Figs. 3, 4 and 12, the connections are generally similar to those shown in Fig. 1, except that means are provided for connecting the resistance member 20 in shunt relation to the inducing field winding 14 at high running speeds (Figs. 12E and 12F). The sequence of operation is similar to that set forth in Fig. 2, the machine first operating as a repulsion motor, then as a doubly-fed motor at comparatively low voltage, then as a doubly-fed motor at higher voltage and finally as a straight series motor with a resistance in parallel to the inducing field winding. All this is set forth in detail in Figs. 4 and 12 and needs no further elucidation.

Referring to the form of my invention shown in Figs. 5 and 6, I sometimes find it desirable to provide means for connecting the intermediate connection of a doubly-fed motor to a plurality of voltage taps on the source and I find that the resistance member 20, in addition to its function in providing a smooth and sparkless transition from the repulsion connection to the doubly-fed connection, may be employed to advantage in making the transition from one voltage tap to another with the intermediate connection. I have not illustrated in this figure a resistance member to be connected across the terminals of the armature 12 since I find that, under many conditions, a satisfactory first speed may be obtained by starting directly as a repulsion motor, with a short circuit across the terminals of the armature 12, such as is provided by closing a switch 7$^b$. It will be observed, by a study of the sequence chart given in Fig. 6, that a continual reversion is made to the connection wherein only switches 1^b 6^b and 8^b are closed. It will be understood that this connection exists only for an instant, when making the transition from one voltage tap to another, as it is obvious that a reversion for any appreciable length of time to this low-speed connection would cause a violent change in the speed of the motor. It is necessary to pass through this instantaneous connection because if, for example, the switch 3^b were closed before the switch 4^b were opened, a short circuit would be connected across a portion of the source 15 and it would be necessary to employ a preventive resistance, with its attendant switches and complicated circuits, in order to obviate the harmful effects of such a short-circuited arrangement.

Figs. 7 and 8 are similar to the other figures except that the motor 12 is provided with a commutating winding 19 in addition to the inducing winding 14 and the resistance member 20 is shown in connections whereby it may be placed in shunt relation to the commutating winding, if desired, to obtain an especially effective running position at high speeds.

I frequently find that it is desirable, in order to obtain a uniform acceleration over a great range of speeds and in order to provide a large number of efficient running positions, to combine several of the features of the above described circuits, and I have shown a composite control circuit of this character in Figs. 9 and 10. At starting, the armature 12 is shunted to give a repulsion motor action. An intermediate connection for a double feed is then set up through the switch 4^d by means of the switches 9^d, 11^d and the resistance member 20. A beneficial intermediate speed position may be obtained by temporarily feeding the armature separated by closing a switch 22^d, as described in connection with Figs. 1 and 2 and indicated in position 4 of the sequence chart shown in Fig. 10. The voltage on the inducing field 14 is next raised by changing from the tap 5^d to the tap 6^d by means of the switch 7^d and the resistance member 21. In order to still further increase the speed, the voltage impressed upon the armature may next be increased by changing the intermediate connection from the tap 4^d to the tap 9^d by means of the switches 10^d and 11^d and the resistance member 21. Finally, by opening the intermediate connection and connecting the fields in series relation with the armature, with the resistance member 20 connected in shunt relation to the field winding 14, the highest running position is obtained.

I have, in all instances, shown the various portions of my doubly-fed motor receiving energy from a single source of alternating current, but it will be obvious to those skilled in the art that I may, if desired, energize the armature and the exciting field winding from one source and the inducing winding from another source of proper phase relation thereto, thus obtaining even greater flexibility of operation than is possible with the connections shown.

While I have shown my invention in several distinct modifications, it will be understood by those skilled in the art that it is susceptible of several additional minor changes without departing from the spirit thereof, and I accordingly desire that no restrictions shall be placed thereon except such as are specifically set forth in the appended claims.

I claim as my invention:

1. In a control system, the combination with a transformer winding, of an alternating-current commutator motor having an inducing field winding, an impedance device, means for connecting said motor initially as a repulsion motor, means for subsequently establishing a doubly-fed connection for said motor, means for temporarily inserting said impedance device in parallel with said inducing field winding during the change from repulsion to doubly-fed motor connections, and means for temporarily connecting said impedance device across a certain portion of said transformer winding for changing the voltage applied to said motor without short circuiting said transformer.

2. In a control system, the combination with a transformer winding, of an alternating-current commutator motor having an inducing winding, means for connecting said motor initially as a repulsion motor, means for subsequently establishing a doubly-fed connection for said motor, an impedance device, means for temporarily inserting said impedance device in parallel with said inducing-field winding during the change from repulsion to doubly-fed motor connections, and means for finally connecting said motor for series operation, with said impedance device in parallel with said inducing-field winding.

3. The method of securing uniform acceleration and a plurality of satisfactory operating positions with an alternating-current motor of the series commutating type provided with an inducing field winding which comprises operating said motor at low speeds as a doubly-fed motor, and at high speeds as a doubly-fed motor with a device having ohmic resistance in parallel with said inducing field winding.

4. The method of securing gradual acceleration and a plurality of satisfactory operating conditions for an alternating-current motor of the series commutating type provided with an inducing field winding which comprises operating said motor at low speeds as a doubly-fed motor, at medium speeds as a doubly-fed motor, with a device having ohmic resistance in parallel with said inducing field winding, and at high speeds as a series motor, with said device in parallel with said inducing field winding.

In testimony whereof, I have hereunto subscribed my name this 22nd day of Sept., 1914.

RUDOLF E. HELLMUND.

Witnesses:
A. L. BROOMALL,
B. B. HINES.